Oct. 17, 1961 G. F. SCHMIDT 3,005,053

TELEPHONE SIGNALING SYSTEM

Filed Sept. 9, 1957 2 Sheets-Sheet 1

INVENTOR
G. F. SCHMIDT
BY
A. F. Kane
ATTORNEY

Oct. 17, 1961 G. F. SCHMIDT 3,005,053

TELEPHONE SIGNALING SYSTEM

Filed Sept. 9, 1957 2 Sheets-Sheet 2

INVENTOR
G. F. SCHMIDT
BY
G. F. Kane
ATTORNEY

United States Patent Office 3,005,053

Patented Oct. 17, 1961

3,005,053

TELEPHONE SIGNALING SYSTEM

George F. Schmidt, Richmond Hill, N.Y., assignor to Bell Telephone Laboratories, Incorporated, New York, N.Y., a corporation of New York Filed Sept. 9, 1957, Ser. No. 682,794
5 Claims. (Cl. 179—18)

Figures 1, 2:
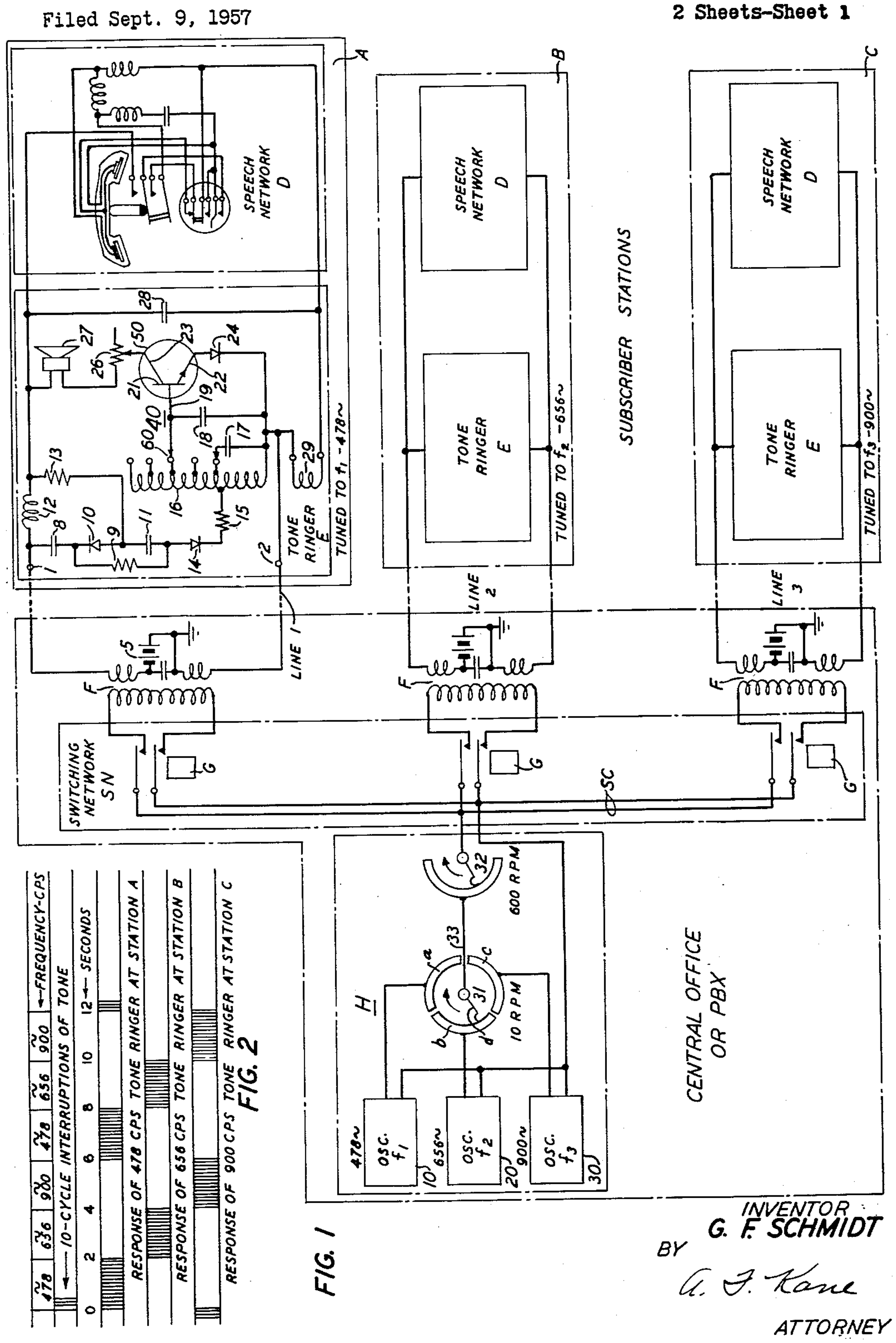

This invention relates to telephone systems and particularly to a selective signaling system for single-party or private telephone lines.

In signaling a called subscriber station it is usual practice to employ an audible signal device at the station and to operate the same on ringing current transmitted from a central office or private branch exchange. In installations involving a plurality of mutually isolated subscriber stations this practice is particularly effective. However, there are numerous instances or locations, such as brokerage houses, department stores, etc. where one or more operatiors or attendants are required to service incoming calls on a plurality of closely grouped telephones. In instances where the individual telephones terminate single-party or private lines, the audible signaling devices or ringers respond similarly to signaling current from the same source of current at a central office or private branch exchange and emit substantially identical tones. The attendant or attendants therefore are confronted with the problem of determining which of the group of telephones is being signaled. This problem, while particularly annoying when the signal devices are operated by the same signal current and produce the same tone signal, is none the less difficult when the ringers emit slightly different tones and are operated simultaneously. Obviously, as in the latter case, the simultaneous reception of one or more tones is not conducive to the ready recognition of a plurality of call signals and the identification thereof with particular telephones.

It is the object of this invention to facilitate and otherwise insure the ready recognition and identification of telephone call signals on single-party telephone lines which terminate in a group of closely associated telephone sets.

This object is attained in accordance with a feature of the invention by utilizing a common multifrequency source of signaling current at a central office or private branch exchange; transmitting the multiple frequency components of the signaling current source in a predetermined time sequence or pattern; and in utilizing frequency selective subscriber signaling devices to respond intermittently to any of the transmitted components.

In accordance with another feature of the invention, the tone signal device at a subscriber station may be adjusted upon installation, or at any time by the subscriber, as desired, to respond to any of the transmitted frequencies, thus enabling the customer to be offered a choice of call signal tones such as "low," "medium" or "high." Obviously this freedom of choice would be available also in ordinary private line service where there is no need to distinguish between telephone call signals.

A further feature of the invention contemplates modulating or interrupting each of the multiple frequencies differently in instances where greater distinguishability is required. Thus, the tone signals may be made to differ in time pattern as well as in fundamental frequency.

Figure 4:
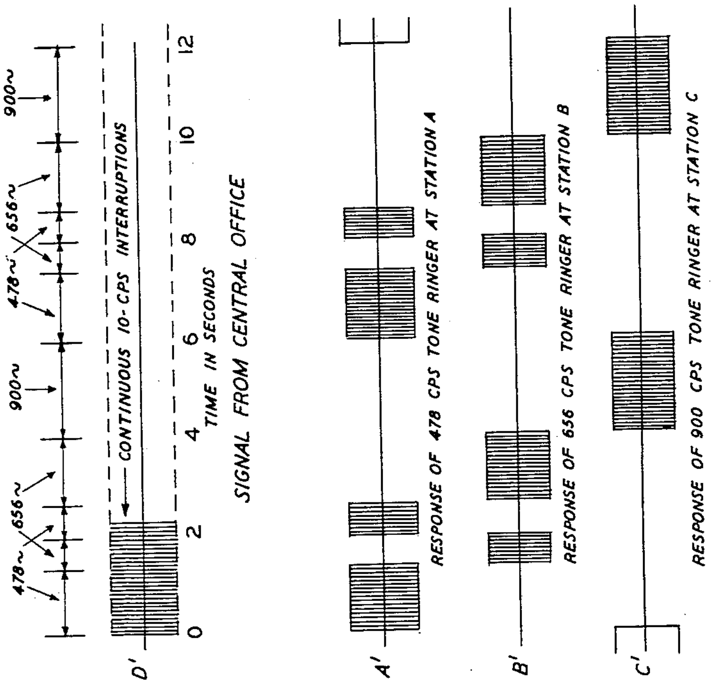
Figure 3:
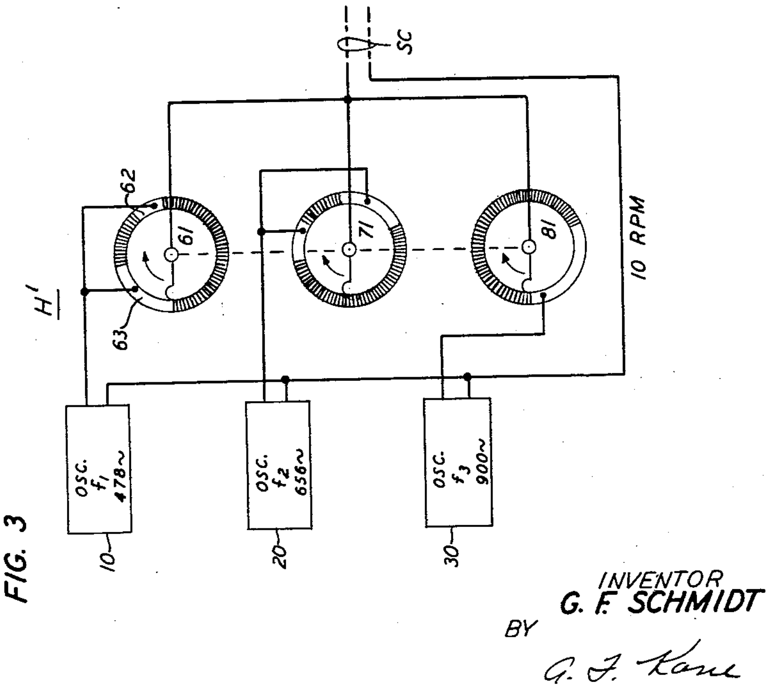

These and other features of the invention will be readily understood from the following description when read with reference to the accompanying drawings, in which:

FIG. 1 is a diagrammatic representation of the essential elements of a single-party line signaling system involving features of the invention. Specifically, a subscriber station equipment is shown contained in each of the large broken-line enclosures A, B and C; that in enclosure A being shown in detail and each consisting of a conventional type of speech network D and a tone ringer E. Each of the substations A, B and C is individually associated with a telephone line circuit which is shown terminating at a central office or private branch exchange in the usual battery supply which, for purposes of simplicity of disclosure, is shown associated with one winding of a coupling transformer F, the other winding of which is shown terminating in make-contacts of a switching relay G. At the extreme left of FIG. 1 is shown a single party line signaling current source H which, for purposes of illustration, is indicated as comprising three oscillators the outputs of which are fed to a common loop, or signaling channel by way of two interrupters. These interrupters are shown as mechanical brush-type interrupters but may also be of an electronic type, as desired;

FIG. 2 is a graphic representation of the manner in which the tone ringers at the three substations A, B and C respond to the transmission of three fundamental frequencies from the central office or private branch exchange, each frequency being applied for two seconds in each six second signaling cycle;

FIG. 3 is a diagrammatic illustration of a modification of the single-party line source of signaling current shown in FIG. 1 which provides greater distinguishability between the tone signals at the subscriber stations; and FIG. 4 is a graphic representation of the manner in which the tone ringers at the three substations A, B and C respond to current transmitted from the signaling current source shown in FIG. 3.

Referring now to FIG. 1, the illustrated tone ringer or frequency selective horn-type signal circuit E is of the type disclosed in a co-pending application of L. A. Meacham and F. West, Serial No. 469,633, filed November 18, 1954, which issued on February 18, 1958, as Patent 2,824,175. This circuit is described in minute detail in that application so that it is deemed adequate for purposes of this application to resort only to a somewhat abbreviated description.

Connected to the input terminals 1 and 2 of the tone ringer E is a current-limiting network which comprises capacitance 8 having one lead thereof connected to terminal 1 and the other lead connected to a resistance 9. Also connected to the capacitance 8 and in parallel with resistance 9 is a diode element 10 connected in series with a capacitance 11. A choke coil 12 in series with resistance 13 is connected between the input terminal 1 and the junction of the diode element 10 and the capacitance 11. The resistance 9 and the capacitance 11 are connected to a diode element 14 which is poled in opposition to the diode element 10. A resistance 15 is connected between the diode element 14 and an inductance 16 of the filter network 40. The inductance 16 has a plurality of taps to which may be connected either or both of a pair of capacitances 17 and 18. By this arrangement the filter network may be selectively tuned to any of a number of signaling frequencies. Advantageously, the filter network is adjusted to the signaling frequency assigned to the subscriber station at the time the sub-set is installed. Obviously, provision may be made for enabling the subscriber to adjust the set, if desired.

The filter network 40 is connected by a lead 19 to the base electrode 21 of a transistor 50. The emitter electrode 22 of the transistor 50 is connected to one side of a biasing element 24, which may be a semiconductor diode such as a silicon junction diode. The other side of the diode is connected to the capacitances 17 and 18, the inductance 16 and the input terminal 2. The collector terminal 23 of transistor 50 is connected to the arm 25 of a rheostat 26. A transducer 27, which may be of the horn-type is connected between the potentiometer 26 and the choke coil 12. The transducer is also connected to one side of capacitance 28, the other side of which is connected to one terminal of a coil 29. Coil 29 is coupled to the filter network coil 16 and is connected at its other terminal to the input terminal 2.

In the operation of the tone signal device, a direct current potential for supplying power to the transistor 50 is applied over the subscriber loop from the source of direct current potential 5 in the central office or private branch exchange. The positive side of the line is connected to the input terminal 1 and the negative side of the line to the input terminal 2. The direct current is then connected through the choke coil 12, the transducer 27 and the volume control potentiometer 26 to the transistor collector electrode 23. The biasing diode 24 is connected in the return circuit between the emitter element 22 and the input terminal 2.

Alternating current ringing signals of the resonant frequencies assigned to the various subscriber stations A, B and C, for example, 478 cycles, 656 cycles and 900 cycles are transmitted from the common signal voltage source H in the central office or private branch exchange. The ringing signal current flows from terminal 1 through capacitance 8, diode 10, capacitance 11, diode 14, resistance 15 and a part of the winding of inductance 16 to terminal 2. Diodes 10 and 14 may be of the silicon type which have impedances of about 900 ohms each when in the conducting state. When the signaling current is at the resonant frequency of the filter network, the impedance of the input section of the inductance 16 is at its maximum value, with the result that the limiting input current produces a corresponding maximum voltage across the coil. At this frequency, the positive peaks of the voltage across the anti-resonant filter circuit exceed the forward voltage of the normally non-conducting biasing diode 24 and the excess causes the transistor 50 to pass pulses of base current which, in turn, produce amplified pulses of collector current. Due to the action of the biasing diode 24, the transistor circuit operates as a class C amplifier and produces pulses which are rich in harmonics and generate a complex tone in the transducer 27. The choke coil 12 and capacitance 28 acting as a power supply filter for the amplifier, prevent these pulses from being fed back to the loop conductors of the line. For further elaboration on the tone ringer circuit just described briefly, reference may be made to the above identified co-pending application.

To the right of the tone ringer circuit E is shown a conventional anti-sidetone speech network D. In this instance, the usual electromagnetic ringer is omitted.

The signaling current source H located at the central office or private branch exchange is shown, for exemplary purposes, as comprising oscillators 10, 20 and 30 which generate the fundamental signaling frequencies 478 cycles, 656 cycles and 900 cycles, respectively, a 10 r.p.m. three segment interrupter 31 and a 600 r.p.m. modulating interrupter 32, the output of which is fed to the common signaling channel SC. The output of the interrupter 31 is fed to the interrupter 32 by way of conductor 33. The interrupters 31 and 32 may be driven by a common continuously operating motor or equivalent suitable means, not shown.

The signaling channel SC is adapted to be connected to one or more of the subscriber lines incident to the seizure of such line or lines at the central office or private branch exchange upon extension of a call or calls to such lines in well known manner. For exemplary purposes and to simplify the disclosure, the switching network SN, which functions to extend the signaling channel SC to the various lines, is shown comprising a relay G per line, which, when operated, cuts through the signaling channel SC to the repeating coil F associated with the corresponding line.

For the purpose of further describing the operation of the disclosed system it will be assumed: (1) that relay G, associated with the line of substation A, has been operated and the signaling channel SC connected to the line by way of the associated repeating coil F; (2) that the three frequencies 478 cycles, 656 cycles and 900 cycles are generated at the central office or private branch exchange by the oscillators 10, 20 and 30 and are impressed on the signaling channel SC by way of the commutators 31 and 32; and (3) that the tone ringer E at substation A is tuned to respond to a frequency of 478 cycles. It will be observed that the interrupter or commutator 31 is illustrated as consisting of three mutually isolated segments *a*, *b* and *c*, each spanning approximately one-third of the circular path traversed by the associated brush *d*. It will also be noted that the commutator segment *a* is electrically connected to the oscillator 10, the frequency output of which is 478 cycles; the commutator segment *b* is electrically connected to the oscillator 20, the frequency output of which is 656 cycles; and the commutator segment *c* is electrically connected to oscillator 30, the frequency output of which is 900 cycles. It is apparent, therefore, that each cycle of operation of the brush *d* consumes a time interval of six seconds so that each of the three generated frequencies is connected to the signaling channel SC, and therefore, to the line associated with station A for a period of substantially two seconds and is disconnected therefrom for a period of four seconds. The tone ringer at station A having been tuned to respond only to 478 cycles by the particular setting of the switch 60 with respect to the taps on impedance coil 26, will therefore operate for two seconds in each six second cycle at the 478 cycle frequency.

Had either or both relays G associated with the lines on which stations B and C are located been operated, or whenever they do operate, the corresponding lines will have impressed thereon the three frequencies of the signaling source H but the tone ringer at each station, having been tuned to a different one of the frequencies, 656 cycles and 900 cycles, will respond only to such particular frequency and will each emit a distinctive tone, characteristic of the frequency to which it is tuned.

It will be noted also that, while the three tone ringers at stations A, B and C emit distinctive tone signals, they do so at different times during the signaling interval. To particularize, during the two-second interval in which the tone ringer at station A is responding to the 478 cycle component of the signaling source H, the tone ringers at stations B and C are silent. Similarly, during the two-second interval in which the tone ringer at station B is responding to the 656 cycle component of the signaling source H, the tone ringers at stations A and C are silent. Finally, during the two-second interval in which the tone ringer at station C is responding to the 900 cycle component of the signaling source H, the tone ringers at stations A and B are silent. This sequential and selective response of the three tone ringers at stations A, B and C is graphically illustrated by FIG. 2 wherein the vertically lined areas indicate ringer response and the intermediate blank areas indicate silent intervals. Thus, recognition of call signals at closely located stations is facilitated not only because of the distinctiveness of the signal tones emitted by the respective ringers but also because of the time spacing of the tone signals. In the exemplary embodiment, three tone signals of two seconds duration are produced sequentially so that, even in the extreme condition involving simultaneous seizure of all three lines, ready recognition and identification of all three signals are assured.

FIG. 3 illustrates, schematically, a modification of the central office or private branch exchange source of signaling current which may be employed in the event that greater discrimination between the signals at the several stations is desired. In this embodiment the signal source H' comprises the same three frequency components, each feeding the signaling channel SC by way of a distinctively characterized commutator such as commutators 61, 71 and 81. Commutator 61, for example, includes two conducting segments 62 and 63 which are fed by the oscillator 10 and are of such linear dimensions as to produce the tone ringer response at station A graphically illustrated by the line A' in FIG. 4. In this case, the six-second signaling cycle is made up of four consecutively spaced intervals, a "live" interval of one and one-third seconds, a "silent" interval of two-third second, a "live" interval of two-third second, and a "silent" interval of three and one-third seconds, and the tone ringer at station A emits a tone signal characteristic of the 478 cycle frequency during the indicated "live" intervals and is inactive during the "silent" intervals. A similar six-second signaling cycle at station B resulting from the pattern of commutator 71 would consist of a "live" interval of one and two-third seconds, a "silent" interval of one-third second, a "live" interval of one and one-third seconds and a "silent" interval of three and two-thirds seconds, while a six-second cycle at station C resulting from the pattern of commutator 81 would comprise one "live" interval of two seconds followed by a "silent" interval of four seconds. It will be observed that the ringers at stations A, B and C never emit tone signals simultaneously because of the distinctive time patterns effected by the commutators, it being apparent that the conducting segments of the three commutators are never in phase. Stated differently, only one commutator at a time is in conducting condition with respect to the signaling channel SC.

It is apparent that the instant invention may embrace variations of the ten-cycle interruption rate, or different patterns of frequency modulation of the three fundamental frequencies specifically employed in the preceding descriptions. Just as habits of articulation contribute to the distinctive qualities of familiar voices, so these modulation effects can be used to give subtle individuality to each of the three signals. It is further apparent that the invention is capable of other modifications, arrangements and substitution of parts and elements without departing from the spirit of the invention.

It is apparent also that the disclosed invention is particularly suited to telephone installations involving extension stations. The tone ringers at such extension stations could be caused to sound simultaneously at the same pitch or in sequence at different fundamental frequencies. A systems advantage of the latter arrangement would be to avoid adding together the direct currents drawn by the several extension ringers. For example, in the case of a main station with two extensions, the intermittent loop current, instead of approaching 4.5 milliamperes for two seconds out of six, would remain at its usual 1.5 milliampere value throughout the calling cycle.

What is claimed is:

1. In a telephone signaling system the combination of a central office, a plurality of subscriber stations, a private line connecting each of said stations with said central office, a signal device at one of said stations selectively responsive to a particular alternating current frequency, a signal device at another of said stations selectively responsive to a different particular alternating current frequency, a source of signaling current at said central office including means for generating the said particular alternating current frequencies, means at said central office for sequentially transmitting the said particular alternating current frequencies over each of said lines, and means at said stations for rendering each of the associated devices selectively responsive to a different one of said frequencies, whereby the signal devices at said stations are operated sequentially.

2. In a telephone signaling system the combination of a central office, a plurality of subscriber stations, a private line connecting each of said stations with the said central office, a source of signaling current at said central office including means for generating a plurality of fundamental frequency currents, means for transmitting the fundamental frequency currents of said source over each of said lines in accordance with a single predetermined time pattern, a signal device at each of said stations including frequency responsive means, and means at each station for tuning the frequency responsive means thereat to any of the fundamental frequencies of said source whereby the signal devices at said stations operate in accordance with the said predetermined time pattern only when each is tuned to a different one of the said fundamental frequencies.

3. In a telephone signaling system the combination of a central office, subscriber stations, a private line interconnecting each subscriber station to said central office, a signal device at each of said subscriber stations including frequency selective responsive means, and a source of signaling current at said central office including means for generating a plurality of fundamental frequency currents, means for modulating each of the generated fundamental frequencies in accordance with a different time pattern and means for transmitting the modulated frequency currents over said line to operate each of the frequency responsive signal devices at said stations in accordance with the particular time pattern in which the frequency to which the device is responsive is modulated.

4. In a telephone signaling system, a plurality of subscriber stations, a central office, a ringing current supply system at said central office comprising means for generating a plurality of fundamental frequency currents, a single signal channel, separate contact means associated with the output terminals of each of the fundamental frequency generating means, means for scanning said separate contact means sequentially and correspondingly applying the respective outputs thereof to said signaling channel, switching means for connecting said subscriber stations to said signal channel, frequency responsive signal means at each of said stations and means at said stations for rendering the signal means thereat selectively responsive to any of the sequentially applied fundamental frequencies.

5. In a telephone signaling system, a plurality of subscriber stations, a central office, a source of multi-frequency signaling current at said central office, a single signaling channel extending from said signaling current source to said stations, means for applying the frequency components of said source of signaling current to said single channel in accordance with a predetermined time spaced pattern, and a signal device at each of said stations tunable to a different frequency component of the said signaling current source whereby each of said signal dveices operates at different times on the frequency to which it is tuned to produce a distinctive tone signal.

References Cited in the file of this patent

UNITED STATES PATENTS

| | | |
|---|---|---|
| Re. 21,659 | Adler | Dec. 17, 1940 |
| 1,600,673 | Johnson | Sept. 21, 1926 |
| 2,335,512 | Herrick | Nov. 30, 1943 |
| 2,702,831 | Elliott | Feb. 22, 1955 |
| 2,872,518 | Trousdale | Feb. 3, 1959 |